March 28, 1939.  P. RAUHUT  2,152,327

ALTERNATING CURRENT COMMUTATOR MACHINE

Filed March 5, 1937   4 Sheets-Sheet 1

Paul Rauhut
Inventor
by Warren Dunham
his atty.

March 28, 1939. P. RAUHUT 2,152,327
ALTERNATING CURRENT COMMUTATOR MACHINE
Filed March 5, 1937    4 Sheets-Sheet 2

Paul Rauhut
Inventor
by Warren Dunham Foster
his atty.

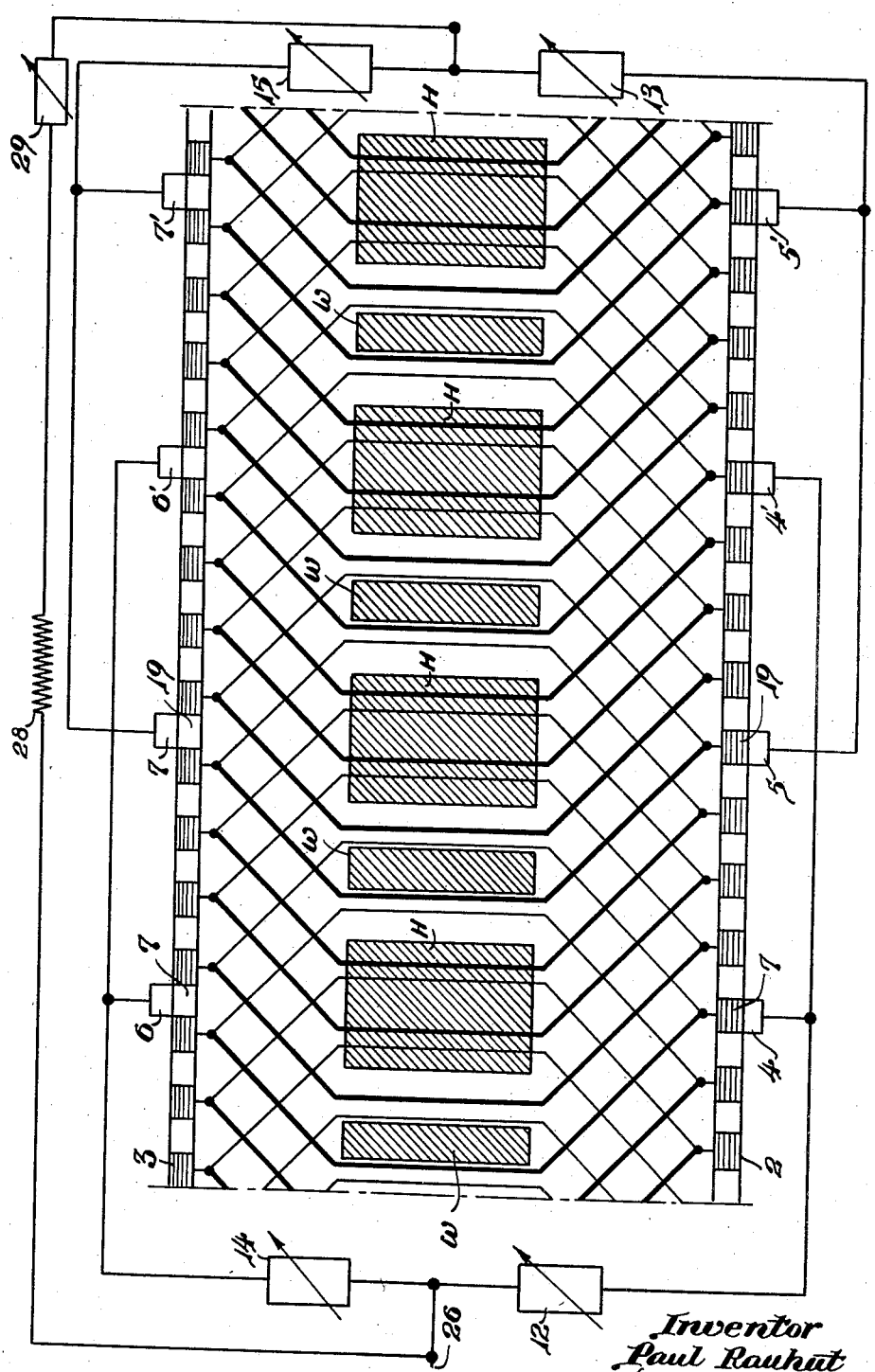

Patented Mar. 28, 1939

2,152,327

UNITED STATES PATENT OFFICE 2,152,327

ALTERNATING CURRENT COMMUTATOR MACHINE

Paul Rauhut, Berlin-Karlshorst, Germany, assignor to Julius Pintsch Kommanditgesellschaft, Berlin, Germany, a German company Application March 5, 1937, Serial No. 129,178
In Germany March 2, 1936

12 Claims. (Cl. 172—276)

This invention relates to alternating current commutator machines, and more particularly to alternating current commutator machines having a high starting torque.

The invention is of a particular advantage in avoiding disturbances such for example as brush sparking connected with the electromotive force induced by the transformer action in the coils short-circuited during commutation, and is of considerable importance in those machines in which the field is stronger in starting than when running. An object of the invention is the counter-acting of the transformer electromotive force, with the consequent increase of the flexed density or of the frequency and in such a manner that the current reversal and therefore the reactance electromotive force is influenced.

According to the invention, a rise of the transformer E. M. F. under the brushes is attained and at the same time a disturbance of the current reversal is avoided by a (supplementary) resistance being connected in one or each of the paths short-circuited by the brushes, this resistance being regulated to a suitable value at any particular speed of the machine with relation to the commutator potential resulting from the transformer E. M. F. and the reactance E. M. F. The supplementary resistance is of small or zero value when the machine is running, whilst in starting, or when at a stand-still it rises to a value of a higher order than when running. The resistance is effective against the influences of the transformer E. M. F. in starting up the machine.

A convenient regulation of the supplementary resistance is made possible according to the invention by such an armature or such an armature winding being chosen that the supplementary resistance can be arranged in a fixed position. The resistance can be mounted separately from the armature or on the outer casing of the machine or entirely apart from the machine.

An arrangement which permits the use of stationary commutating resistances consists in the use of auxiliary commutator segments and brushes of suitable width. The auxiliary segments are not connected to the winding and are located between main segments which are connected on to the armature winding so that the auxiliary segments act as separators between the adjacent main segments. The brushes are of such a width that they co-operate with the commutator never to short-circuit two main segments directly through the running surface of a single brush. The width of the brush is consequently according to the invention at the most equal to the sum of the width of an auxiliary segment and of two insulation spaces between segments. The potential of a winding element no longer appears between two brushes touching adjacent commutator segments, but appears between two brushes each of which touches a main commutator segment. By the use of the present invention it is possible to control the commutator potentials by means which need no longer be arranged in the interior of the machine.

A preferred embodiment of the object of the invention which permits the supplementary resistance being mounted in a fixed position consists in the armature being provided with two separate commutators. The two commutators can be arranged on the same side of the armature winding, but, according to the invention, are preferably arranged on different sides of the armature winding. This arrangement is advantageous for the reason alone that a reduction of the number of turns of the individual winding elements is thereby possible, namely, in the extreme case, to half turns per commutating winding element. The commutators, which both have brushes, are, according to the invention, provided with auxiliary copper segments, preferably dummy segments. According to a preferred embodiment of the invention corresponding brushes on different commutators, have electrically relatively corresponding positions. The brushes, the commutators and the winding so co-operate according to the invention that at one instant one brush of a commutator is exactly on an auxiliary segment when a corresponding brush of the other commutator is on a main segment, and that at another instant the first brush is on a main segment when the latter brush is on an auxiliary segment, the two positions always following each other in alternate sequence. According to the invention, the arrangement is so contrived that all the brushes of a commutator are simultaneously on main segments or respectively on auxiliary segments, so that the following two positions alternate in the running: all the brushes of one commutator are on main segments and simultaneously all the brushes of the other commutator are on auxiliary segments, or respectively all the brushes of the first commutator are on auxiliary segments and simultaneously all the brushes of the other commutator are on main segments. Preferably all the segments are made of the same width. According to a further embodiment of the invention, each commutator is made with as many auxiliary segments as there are main segments, the auxiliary segments being always arranged between two main segments. The brushes are of such a width that never more than two segments can be simultaneously contacted, that is, their width is to be at the most equal to the sum of the width of an auxiliary segment and the width of two insulation spaces between the segments.

The connection of corresponding brushes of the two commutators can take place within the stator, for example, through the pole gaps or the pole centres or through slots in the poles. Preferably such connections are carried externally round the stator core and preferably within the casing. The connections may be placed in recesses which are made on the outer surface of the stator core. Such recesses are preferably arranged at the centre of the pole since there the saturation of the stator iron is the least. According to the invention, such connections are so made that they are as far as possible without leakage, for example, by reducing the distance apart of unlike brushes from each other, avoiding or blocking leakage paths through iron in the vicinity of such connections, and the like. The said nature of the connecting means is of particular importance when flux displacement is used.

The connections of corresponding brushes of different commutators form a short-circuit path for the transformer E. M. F. The supplementary resistances according to the invention are to be arranged in this short-circuit path. These resistances can be of ohmic, inductive, capacitative or of any combined ohmic or inductive or capacitative character.

The connections of brushes of the same name of different commutators are a short-circuit path for the transformer E. M. F. The bridging resistances which may be ohmic, inductive, capacitative, or may have a combined ohmic, inductive, or capacitative character must be inserted in this short-circuit. Where inductive resistances are utilized, a convenient regulation may be obtained by using the principle of flux displacement as the regulating principle. It is preferable to utilize ohmic resistances, since their regulation is extremely convenient and the ohmic character is specially favorable for the current reversion.

The object of the invention is characterised apart from the variable supplementary resistances by essentially a medium dependent on speed opposing, when the machine is running, the transformer E. M. F. The variability of the supplementary resistances alone is insufficient in general for satisfactory operation. As a rule, even in running the transformer E. M. F. will prejudicially affect the commutation. Since, however, in running, the resistances must be small, the short-circuit current caused by the transformer E. M. F. through the brushes would become too great. It is, however, possible in running to make the transformer E. M. F. ineffective by other means.

In the first place, reversing poles may be considered for this. The reversing poles may be so made that in running they not only introduce a potential component which opposes the reactance electromotive force in the armature winding, but they also introduce a potential component which also opposes the transformer E. M. F. The amounts of these components can be made variable independent of each other, or positively dependent upon each other or only one of the two be made variable.

A regulation of the phase of the reversing field can be attained by the shunt reversing pole field winding being provided with tappings so that the effective number of turns of these windings can be varied.

Figure 12:
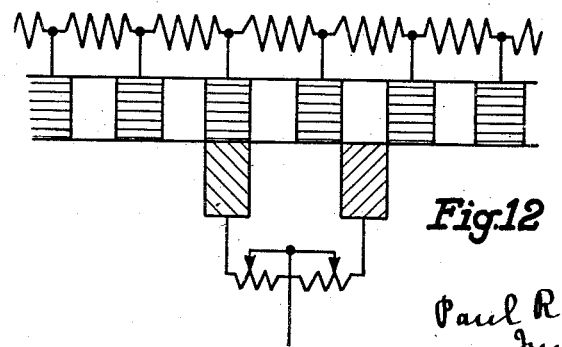

Fig. 12 illustrates an embodiment of the invention using but a single commutator and not a construction where the number of auxiliary segments is equal to the number of main segments, and Figure 13 illustrates an embodiment of the invention in which the transformer E. M. F. through the brushes is rendered ineffective by the use of reversing poles.

Figure 1:
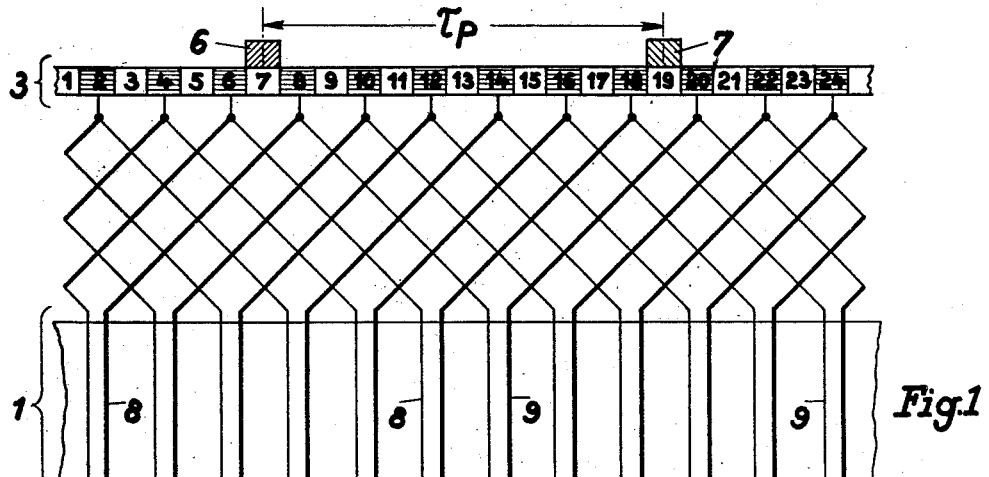
Fig. 1 is a development of an armature winding and commutator segments, with a pair of brushes in one position relative thereto.
Figure 2:
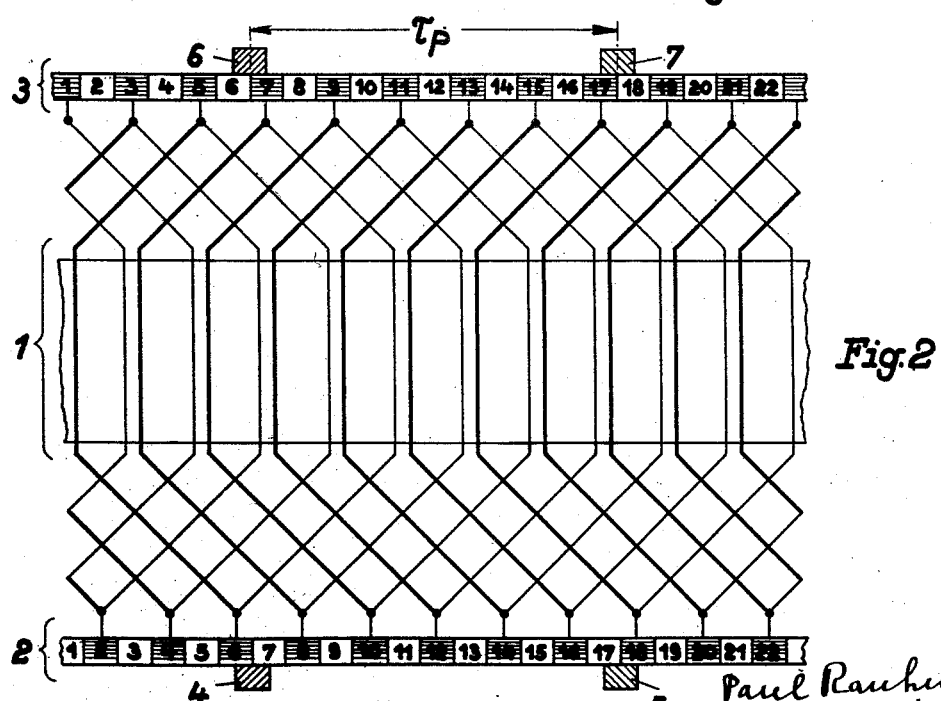
Fig. 2 is a development of an armature winding and commutator segments similar to the arrangement shown in Fig. 1, and showing a pair of brushes in another position relative thereto.

Figures 1 and 2 represent developments of simple lap windings over a double pole division. Figure 1 differs from Figure 2 by the number of the commutator bars. The windings consist always of one turn per coil, that is, one half coil per commutating winding element. The rotor iron is indicated by 1. A commutator is connected on to the windings on each side. The two commutators are indicated by the numerals 2 and 3. Seen from the side of the one commutator, the winding is "uncrossed" or "proceeding forward"; regarded from the side of the other commutator, the winding is "crossed" or "proceeding backward". The windings are here for example so chosen that regarded in Figure 1 from the side of the commutator 2 they appear as uncrossed, whilst with Figure 3 the winding regarded from the side of the commutator 2 is crossed. With both figures, each half coil or each conductor on each side is connected on to a main commutator segment. On the one commutator the main commutator segments have uneven numbers, and on the other commutator even numbers. Between each of the main commutator segments there is an auxiliary segment which is not connected with the winding. Preferably, copper is used as the material for the auxiliary commutator segments. The auxiliary commutator segments could also be made of other material, for example, of insulating material, if the wearing properties can be brought into correspondence with those of the main segments. All the segments here have, preferably, the same width. The brushes are made of such width that they never simultaneously contact with three segments. The positions of corresponding brushes of the two commutators (here the brushes 4 and 6 or 5 and 7) are all alike, that is, relatively alike with respect to the position of the neutral zone. This electrically similar position is also characterised in that at the same instant one brush of a commutator is exactly on a main commutator segment connected with the centre of a coil (without however contacting with the two adjacent auxiliary segments) and the corresponding brush of the other commutator is exactly on that auxiliary segment which is between the main segments connected with the two ends of the same coil (again without coming into contact with the two adjacent main bars). For example, in Figure 1 the brush 4 is exactly on the main commutator segment connected with the centre point of the coil 8, and the corresponding brush 6 is on the auxiliary segment 7 which is between the main segments 6 and 8 connected with the end points of the coil 8, and furthermore the brush 5 is exactly on the main segment 19 which is connected with the centre point of the coil 9, whilst the brush 7 is on the auxiliary segment 19 which lies between the main segments 18 and 20 connected with the end points of the coil 9. Figure 2 is analogous thereto. The like named brushes (4, 6 or 5, 7) are connected together. In Figure 1 the number of the main segments is equal to the number of the auxiliary segments and equal to an even number per commutator, namely, equal to 12. The distances apart of adjacent brushes are all made equal, and the brush pitch is equal to the pole pitch ($\tau p$), calculated on the commutator. It can easily be seen from this that here the resulting sum of the current in all the conductors of the armature is equal to zero, and this with all positions of the armature as compared with the brushes. The arrangement is thus symmetrical, which is very favourable with respect to the current reversal.

In Figure 2, differing from the foregoing example, the number of the main segments is equal to the number of the auxiliary segments and equal to an uneven number per commutator, namely, here equal to 11. The brush pitch is again symmetrical, namely, equal to the pole pitch ($\tau p$). This arrangement permits of flux displacement in the stator yoke.

A feature common to the examples of execution shown is that between corresponding brushes of different commutators, there exists the transformer E. M. F., that is, between brushes 4 and 6 or between brushes 5 and 7. Therefore, the transformer E. M. F. is not short-circuited by the short-circuiting of two adjacent segments by a brush, but the transformer E. M. F. appears between the two brushes located in a zone of commutation. The possibility thus arises of counteracting the transformer E. M. F. by stationary variable resistances. These resistances must be effective between the corresponding brushes. They are large on starting in view of the transformer E. M. F., and small or equal to zero in running in view of the reactance electromotive force.

The resistances form to a certain extent branches through which the current supply takes place. Typical of such branches are those shown in Figures 3 to 9.

Figure 3:
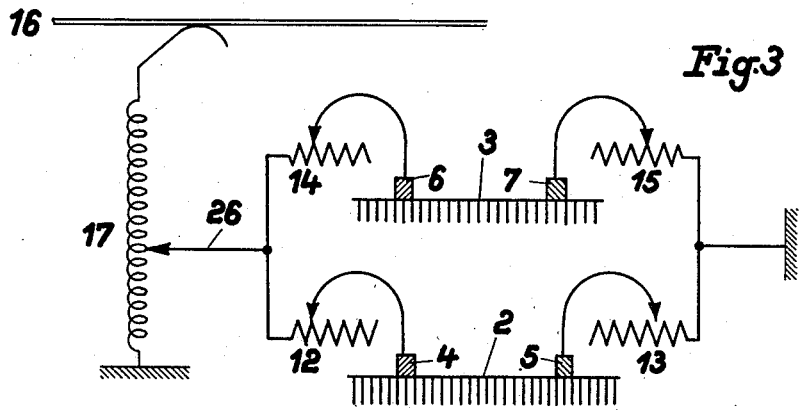
Fig. 3 is a diagrammatic view showing one type of connection of the brushes in one zone of commutation.

In Figure 3 the feed of a railway traction motor takes place from the trolley wire 16 by means of the locomotive transformer 17. The machine has the two commutators 2 and 3 on which slide the brushes 4 to 7. The corresponding brushes 4 and 6 are connected on to the locomotive transformer through the adjustable resistances 12 and 14. The unlike brushes 5 and 7 corresponding to the brushes 4, 6 are connected to earth through the adjustable resistances 13 and 15. The transformer potential between the brushes 4 and 6 or 5 and 7 is now connected on to the resistances 12 and 14 or 13 and 15 connected in series. There are no resistances in the supply lines up to the branch points of the resistances.

Figure 4:
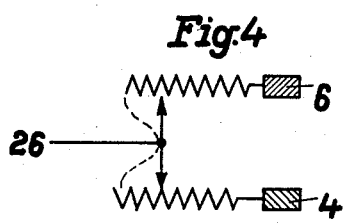
Fig. 4 is an arrangement of resistances serving to connect two brushes in one zone of commutation.
Figure 5:
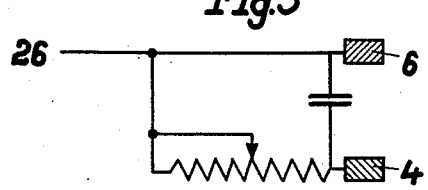
Fig. 5 is another arrangement of resistances serving to connect two brushes in one zone of commutation.
Figure 6:
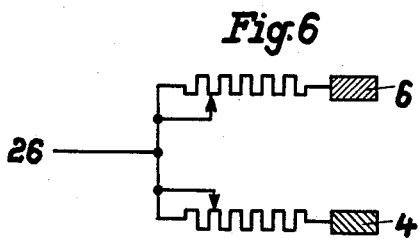
Fig. 6 is still another arrangement of resistances serving to connect two brushes in one zone of commutation.
Figure 7:
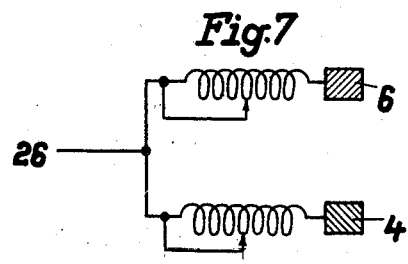
Fig. 7 is still another arrangement of resistance serving to connect two brushes in one zone of commutation.
Figure 9:
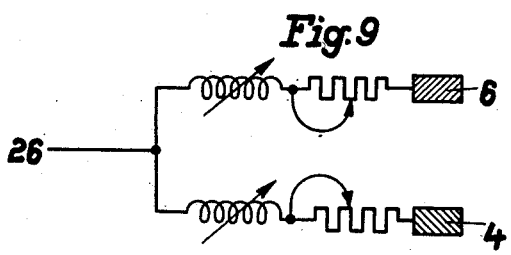
Fig. 9 is still another arrangement of resistances serving to connect two brushes in one zone of commutation.
Figure 8:
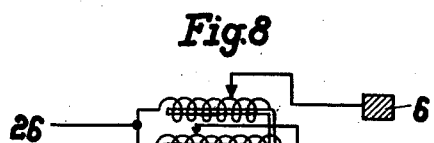
Fig. 8 is still another arrangement of resistances serving to connect two brushes to one zone of commutation.

In Figures 4 to 9, examples are shown in which the supplementary resistances form resistance branches. As in Figure 3, 26 indicates the supply line in which no resistance is connected. Only two corresponding brushes 4 and 6 are shown. In Figure 4 there are resistances in both supply lines to the brushes, in Figure 5 only in the line to a single brush, for example in the line to the brush 4. Figure 6 shows the use of adjustable ohmic resistances, Figure 7 the use of two adjustable inductive resistances, and Figure 8, the use of an adjustable current divider. The two coils are here on the same iron core and in such manner that the transformer potential has as high an inductive resistance as possible, whilst with division of the current the resistance for the working current is as small as possible. Figure 9 shows the series connection of inductive and ohmic adjustable resistances. Instead of the series connection of inductive and ohmic resistances, in other cases a parallel connection may be advisable. Figures 4 to 9 do not exhaust the possibilities of methods of carrying out resistance branches. In addition to the examples shown, other suitable arrangements are possible which come within the scope of the invention. Condensers can also be connected in parallel to the resistances for reducing the switching work of the brushes. There is the possibility of combining a number of branches into a single one. According to the invention, only two resistance branches can be made sufficient for a machine by all the corresponding brushes being connected in parallel to like commutators.

Figure 10:
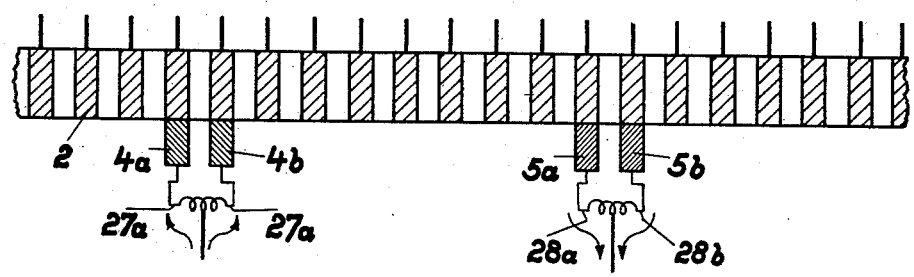
Fig. 10 is a layout of commutator segments having associated therewith a pair of two-part brushes.

Figure 10 shows an arrangement in which each brush is subdivided into two part brushes 4a and 4b, 5a and 5b. The individual part brushes themselves do not short-circuit any potentials between adjacent commutator segments. The commutator segment potential takes place between the two part brushes themselves. The two brushes coincide in their pitch with the pitch of two adjacent main segments. The two part brushes (4a and 4b or 5a and 5b) are connected together by a resistance in particular a current dividing choke (27 or 28). The current is supplied to or collected from the choking coil at its centre. It is so designed that the surges of the branches 27a and 27b or 28a and 28b of the working current counteract each other, whilst it acts as a choking coil for the currents arising from the transformer E. M. F. which in this case exists between the part brushes.

Figure 11:
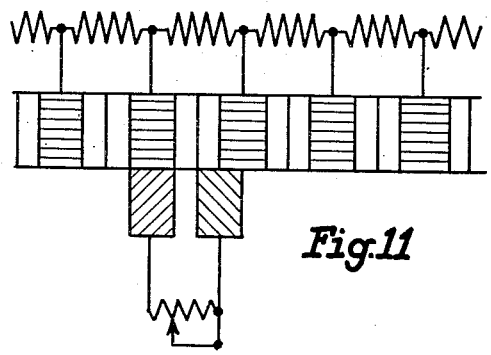
Fig. 11 illustrates an embodiment of the invention using but a single commutator.

Figure 11 shows an arrangement which permits the use of a single commutator. Auxiliary commutator segments are again provided, but in this case they are double the number of the main segments, there being two of them between each two main segments. The brushes are here given a width which is not greater than the sum of the width of two auxiliary segments and three insulation strips between the segment. The brush of one polarity is subdivided into two part brushes which are bridged over by an adjustable supplementary resistance which serves as resistance branch. The distance apart of the two part brushes is not to be smaller than the width of an auxiliary segment. In particular cases, the width of the auxiliary segments can be made smaller than the width of the main segments, this permitting the two part brushes to move together. The two part brushes can be combined in a manner similar to that previously outlined, into a single brush. The arrangement of Figure 11 differs, however, fundamentally from the arrangement shown by Figure 10. For in Figure 11 the distance apart of the two part brushes is so chosen that a transmission of the working current to the winding is always possible in all positions of the commutator, that is, so that at no point of time are both brushes touching auxiliary commutator segments. The distances apart of the two part brushes are so chosen in Figure 10 that such brush positions can occur in which both part brushes can contact with no main commutator segments. From this it will be seen that a brush arrangement according to Figure 10 would not permit a current supply free from trouble. On the contrary with Figure 11 a supply of the working current free from trouble can be attained with all positions of the brushes. In view of the specific current density in the brushes, there is a most favourable distance apart of the two part brushes which is of an order of size as is chosen for Figure 11.

Figure 12 shows an arrangement which permits the use of a single commutator when, however, the number of the auxiliary segments is made equal to the number of the main segments. To permit this, the distance apart of the two part brushes from each other must be increased. If here in order to reduce the size of the commutator the width of the insulation strips is made less, then preferably the distance apart of the two part brushes is made equal to the sum of the width of one main commutator segment and one auxiliary segment, and the width of the part brushes equal to the width of an auxiliary segment. With this arrangement, according to the invention the commutator can be split up into two commutators which are connected on the same winding side and are preferably on the same side of the machine.

In Figure 13 is shown an arrangement for the use of the reversing poles as a means for rendering the transformer E. M. F. ineffective. In Figure 13 the reversing poles W are shown beside the principal poles H. The windings of the reversible poles W are designated 28, and connected to said windings 28 and in series therewith is a regulatable impedance designated 29. By this arrangement the transformer E. M. F. generated during the running of the machine is effectively counteracted.

What I claim as my invention and desire to secure by Letters Patent of the United States is:—

1. In an alternating current commutator machine, an armature winding of the lap type, a commutator consisting of principal segments connected to the armature winding and of auxiliary or dummy segments, commutator brushes the width of which is such that they can cover at most two segments at the same time, two brushes arranged next to each other and connected to the same potential lead in every commutating zone, one of these brushes making complete contact with one principal segment, the other being in complete contact with an auxiliary or dummy segment, a resistance common to the brushes, all the brushes of the same sign always standing on segments of the same sign of all commutating zones being connected directly in parallel, and connected across the common resistance to the corresponding potential lead of the machine, and means for making the resistance of the resistance branches greater when the machine is started than when it is running.

2. In an alternating current commutator machine, an armature winding of the lap winding type, two commutators each consisting of principal segments and of auxiliary or dummy segments arranged between the principal segments and having the same width as the latter, the centers of the laps of the armature winding connected alternately to principal segments of either commutator, commutator brushes of a width such that they can cover at the same time at most two segments, two brushes connected to the same potential lead in every commutating zone, one of said brushes being arranged on one commutator and the other brush on the other commutator, all the brushes of the same sign of one commutator making complete contact simultaneously with one principal segment, the brushes of the same sign of the other commutator covering simultaneously completely one auxiliary or dummy segment and vice versa, all brushes of the same sign of each commutator being connected directly in parallel, a resistance in the common connecting lead of these brushes to the respective potential lead, and means for making these resistances greater in the starting of a machine than when it is running.

3. In an alternating current commutator machine, an armature winding of the lap winding type, two commutators, one arranged on each side of the armature winding and each consisting of principal segments and of auxiliary or dummy segments arranged between the principal segments and having the same width as the latter, the centers of the laps of the armature winding connected alternately to principal segments of either commutator, commutator brushes of a width such that they can cover at the same time at most two segments, two brushes connected to the same potential lead in every commutating zone, one of said brushes being arranged on one commutator and the other brush on the other commutator, all the brushes of the same sign of one commutator making complete contact simultaneously with one principal segment, the brushes of the same sign of the other commutator covering simultaneously completely one auxiliary or dummy segment and vice versa, all brushes of the same sign of each commutator being connected directly in parallel, a resistance in the common connecting lead of these brushes to the respective potential lead, and means for making these resistances greater in the starting of a machine than when it is running.

4. In an alternating current commutator machine, an armature winding of the lap type, two commutators each consisting of principal segments and of auxiliary or dummy segments arranged between the principal segments and having the same width as the latter, the centers of the laps of the armature winding being connected alternately to principal segments of either commutator, commutator brushes having a width such that they can cover simultaneously at most two segments, two brushes applied to the same potential connection in each commutating zone, one of said brushes being arranged on one commutator and the other on the other commutator, all of the brushes of the same sign of one commutator simultaneously making complete contact with one principal segment each, the brushes of the same sign of the other commutator completely covering simultaneously each one auxiliary or dummy segment and vice versa, all the brushes of the same sign on each commutator being connected directly in parallel, a resistance arranged in the common connection of the brushes to the respective potential lead, means for making the resistance greater at the starting of the machine than during its running, and two connecting leads leading from each potential lead to the brushes on the two commutators and each containing the resistance, said connecting leads being passed through the stator bore of the machine.

5. In an alternating current commutator machine, an armature winding of the lap type, two commutators each consisting of principal segments and of auxiliary or dummy segments arranged each between the principal segments and having the same width as the latter, the centers of the laps of the armature winding connected alternately to principal segments of either commutator, commutator brushes the width of which is such that they can cover simultaneously at most two segments, two brushes applied to the same potential connection being provided in each commutating zone, one of these brushes being arranged from one commutator and the other from the other commutator, all the brushes of the same sign of the one commutator making complete contact simultaneously each with a principal segment, while the brushes of the same sign of the other commutator completely cover simultaneously each auxiliary or dummy segment and vice versa, all the brushes of the same sign of each commutator being connected directly in parallel, a resistance in the common connecting lead of the brush to the corresponding potential lead, means for making these resistances greater at the starting of the machine than when it is running, the two connecting leads leading from each potential lead to the brushes on the different commutators and containing in each case a resistance being lead outside around the stator.

6. In alternating current commutator machine, an armature winding of the lap type, two commutators, both commutators arranged on different sides of a machine and consisting of principal segments and auxiliary or dummy segments following each other alternately, the number of the dummy segments of each commutator being equal to the number of the principal segments and equal to an even number per double pole pitch, commutator brushes, the width of which is such that they can cover at most two segments simultaneously, a brush in each commutating zone on the one commutator and a brush on the other commutator, these two brushes being connected to the same potential lead, all the brushes of the same sign of one commutator making complete contact simultaneously each with a principal segment, the corresponding brushes of the same sign of the other commutator just making contact with a dummy segment and vice versa, all the brushes of the same sign of each commutator being connected directly in parallel and a resistance in the common connecting leads of these brushes connected in parallel, to the potential leads, and means for making said resistances greater at the starting of the machine than when it is running.

7. In alternating current commutator machine, an armature winding of the lap type, two commutators, both commutators arranged on different sides of a machine and consisting of principal segments and auxiliary or dummy segments following each other alternately, the number of the dummy segments of each commutator being equal to the number of the principal segments and equal to an even number per double pole pitch, commutator brushes, the width of which is such that they can cover at most two segments simultaneously, a brush in each commutating zone on the one commutator and a brush on the other commutator, these two brushes being connected to the same potential lead, all the brushes of the same sign of one commutator making complete contact simultaneously each with a principal segment, the corresponding brushes of the same sign of the other commutator just making contact with a dummy segment and vice versa, all the brushes of the same size of each commutator being connected directly in parallel and a resistance in the common connecting leads of these brushes connected in parallel, to the potential leads, means for making said resistances greater at the starting of the machine than when it is running, and means for inducing flux displacement comprising arranging the distances of the brushes of unlike sign different from each other alternately by a distance which is an even multiple of the commutator bar pitch.

8. In an alternating current commutator machine, an armature winding of the lap type, a commutator being provided at each end of the armature, each commutator consisting of principal segments and auxiliary or dummy segments alternately following each other, the number of auxiliary or dummy segments of each commutator being equal to the number of the principal segments and equal to an odd number per double pole pitches, the centers of the laps of the armature winding being connected alternately to a principal segment of one commutator and to a principal segment of the other commutator, commutator brushes the width of which is such that they can cover simultaneously at most two principal segments, a brush provided on one commutator and a brush provided on the other commutator in each commutating zone, these two brushes being connected to the same potential lead, all the brushes of the same sign of one commutator making complete contact simultaneously each with a principal segment, the respective brushes of the same sign of the other commutator thus making contact with an auxiliary or dummy segment and vice versa, all the brushes of the same sign of each commutator being connected directly in parallel and the common connecting leads of these brushes connected in parallel to the potential leads each receiving a resistance, means being provided for making said resistances greater at the starting of the machine than as it is running.

9. In an alternating current commutator machine, an armature winding of the lap type, a commutator being provided at each end of the armature, each commutator consisting of principal segments and auxiliary or dummy segments alternately following each other, the number of auxiliary or dummy segments of each commutator being equal to the number of the principal segments and equal to an odd number per double pole pitches, the centers of the laps of the armature winding being connected alternately to a principal segment of one commutator and to a principal segment of the other commutator, commutator brushes the width of which is such that they can cover simultaneously at most two principal segments, a brush provided on one commutator and a brush provided on the other commutator in each commutating zone, these two brushes being connected to the same potential lead, all the brushes of the same sign of one commutator making complete contact simultaneously each with a principal segment, the respective brushes of the same sign of the other commutator thus making contact with an auxiliary or dummy segment and vice versa, all the brushes of the same sign of each commutator being connected directly in parallel and the common connecting leads of these brushes connected in parallel to the potential leads each receiving a resistance, means being provided for making said resistances greater at the starting of the machine than as it is running, and means for obtaining flux displacement which comprises selecting the distance of adjacent brushes of unlike sign of each commutator so that said distances are equal to each other and said distances are an even multiple of a commutator bar pitch.

10. In an alternating current commutator machine, an armature winding of the lap type, a commutator consisting of principal segments connected to the armature winding and of auxiliary or dummy segments, commutator brushes the width of which is such that they can cover simultaneously at most two segments, two brushes coordinated to each other and connected to the same potential leads being provided in each commutating zone, one of these brushes making complete contact with a principal segment, the other being in complete contact with an auxiliary or dummy segment, all the brushes of the same sign always resting on segments of the same kind being connected directly in parallel in all commutating zones and connected across a common resistance to the respective potential lead of the machine, means for making the resistance of the resistance branches greater at the starting of the machine than during its running, reversing poles for producing during the running of the machine a reversing pole component counteracting the transformer E. M. F.

11. In an alternating current commutator machine, an armature winding of the lap type, a commutator consisting of principal segments connected to the armature winding and of auxiliary or dummy segments, commutator brushes the width of which is such that they can cover simultaneously at most two segments, two brushes coordinated to each other and connected to the same potential leads being provided in each commutating zone, one of these brushes making complete contact with a principal segment, the other being in complete contact with an auxiliary or dummy segment, all the brushes of the same sign always resting on segments of the same kind being connected directly in parallel in all commutating zones and connected across a common resistance to the respective potential lead of the machine, means for making the resistance of the resistance branches greater at the starting of the machine than during its running, reversing poles for producing during the running of the machine a reversing pole component counteracting the transformer E. M. F., a series impedance and a winding mounted on the reversing poles and exciting in shunt to the armature winding across the series impedance, and means for regulating the shunted exciting current of the reversing pole automatically and in dependence on the number of rotations of the armature per unit of time.

12. In an alternating current commutator machine, an armature winding of the lap type, a commutator consisting of principal segments connected to the armature winding and of auxiliary or dummy segments, commutator brushes the width of which is such that they can cover at most two segments at the same time, two brushes arranged next to each other and connected to the same potential lead in every commutating zone, one of these brushes making complete contact with one principal segment, the other being in complete contact with an auxiliary or dummy segment, a resistance common to the brushes and consisting of ohmic resistance and impedance, all of the brushes of the same sign always standing on segments of the same sign of all commutating zones being connected directly in parallel, and connected across the common resistance to the corresponding potential lead of the machine, and means for making the resistance of the resistance branches greater when the machine is started than when it is running, means for varying the resistance in the resistance branches in dependence on the number of rotations, and means for varying the composition of the resistances of ohmic resistance and impedance in dependence on the number of rotations of the armature per unit of time.

PAUL RAUHUT.